US006299185B1

(12) United States Patent
Lewis

(10) Patent No.: US 6,299,185 B1
(45) Date of Patent: Oct. 9, 2001

(54) DEVICE FOR SINGLE-HANDEDLY MOVING LARGE OBJECTS

(76) Inventor: Dwaine R. Lewis, 40461 Calle Medusa, Temecula, CA (US) 92591

( * ) Notice: Subject to any disclaimer, the term of this patent is extended or adjusted under 35 U.S.C. 154(b) by 0 days.

(21) Appl. No.: 09/697,782

(22) Filed: Oct. 26, 2000

(51) Int. Cl.[7] ................................................ B62B 1/26
(52) U.S. Cl. ............................................ 280/79.7; 414/11
(58) Field of Search ............................ 280/79.7; 414/10, 414/11

(56) References Cited

U.S. PATENT DOCUMENTS

| D. 310,894 | * | 9/1990 | Smith ................................... D34/23 |
| 3,306,624 | * | 2/1967 | Goss ................................ 280/79.7 X |
| 5,158,312 | * | 10/1992 | Lausch ................................ 280/79.7 |
| 5,284,410 | * | 2/1994 | Sare et al. ............................... 414/11 |
| 5,318,316 | * | 6/1994 | Shurtleff ............................. 280/79.7 |
| 5,378,103 | * | 1/1995 | Rolnicki et al. ......................... 414/10 |
| 5,782,477 | * | 7/1998 | Covert ................................. 280/79.7 |
| 6,234,499 | * | 5/2001 | Irwin et al. ...................... 280/79.7 X |

* cited by examiner

Primary Examiner—Janice L. Krizek
(74) Attorney, Agent, or Firm—Loyal McKinley Hanson

(57) ABSTRACT

A device for single-handedly moving folding tables, plywood sheets, doors, and other large objects, includes a first component having first and second oppositely facing sides and a size and shape enabling a person to carry the first component with one hand. A holding arrangement extends outwardly from the first side of the first component for holding the marginal edge portion of the object to be moved with the flat surface of the object to be moved extending vertically and facing the first side of the first component. A wheel mounted on the first component functions to wheel the first component and the object to be moved along a desired direction of travel, with the wheel rotating about an axis of rotation that is perpendicular to the flat surface of the object to be moved so that the flat surface of the object to be moved is parallel to the direction of travel. In one embodiment, the holding arrangement includes first and second outwardly extending members that extend outwardly from the first side of the first component in spaced apart locations to thereby adapt the holding means to holding a user selected one of a circularly shaped marginal edge portion and a straight marginal edge portion. An adjustable rail member extending between the first and second outwardly extending members holds the object to be moved toward the first side of the first component.

5 Claims, 4 Drawing Sheets

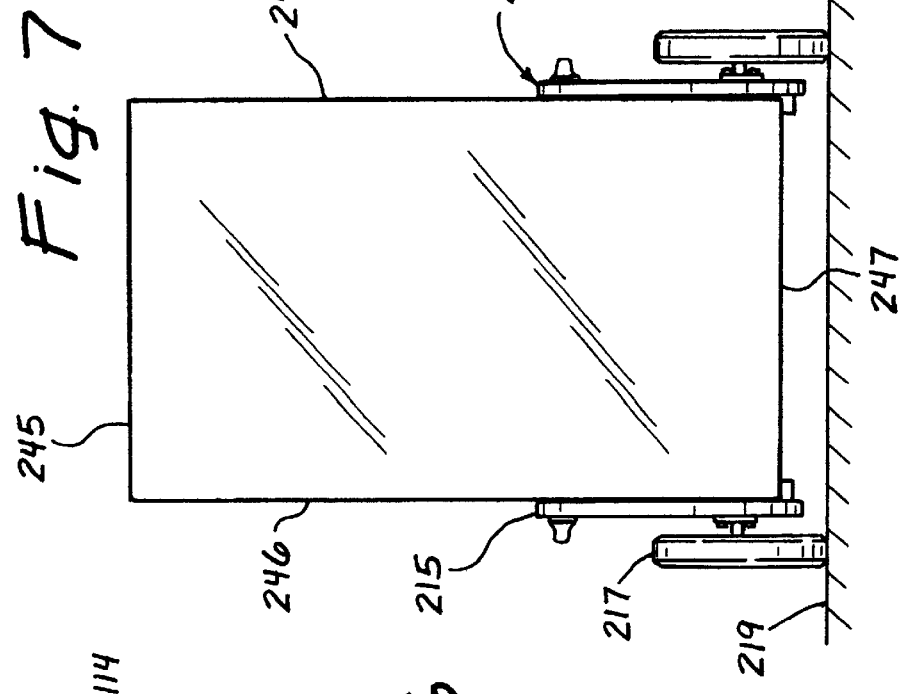
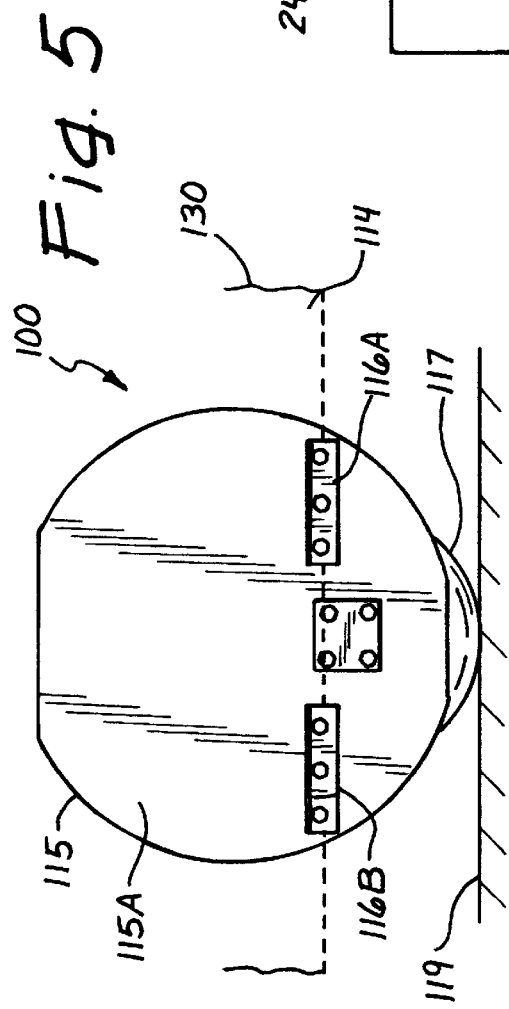
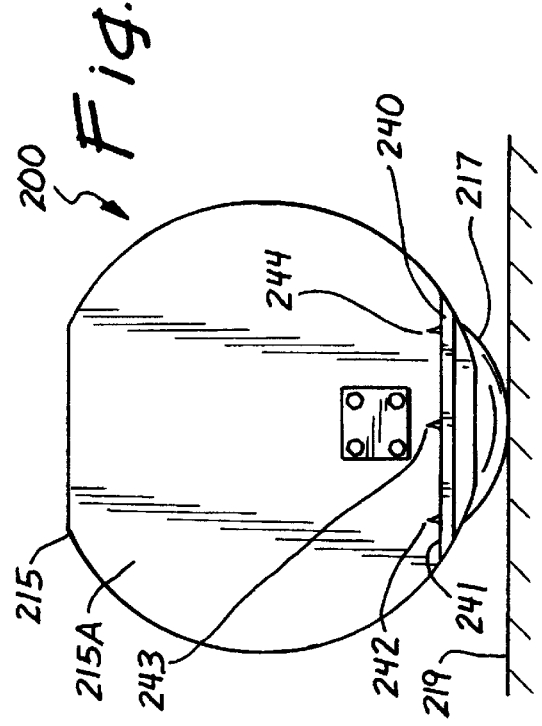

DEVICE FOR SINGLE-HANDEDLY MOVING LARGE OBJECTS

BACKGROUND OF THE INVENTION

1. Technical Field

This invention relates generally to dollies and the like that has a platform on wheels for moving objects, and more particularly to a wheeled device for single-handedly moving large folding tables, plywood sheets, doors, and other large objects.

2. Description of Related Art

Some existing dollies take the form of an upstanding steel framework on two wheels. A lower lip or blade on the framework serves as a platform. The user places the lower lip under a refrigerator or other object to be moved and then tilts the object and dolly so that the object is held on the lower lip with the object leaning against the rest of the framework. The user then wheels the dolly and object to another location with the object held that way.

Although effective for single-handedly moving many objects, the relatively large, heavy dolly is not entirely suited for moving many other objects, including large folding tables, plywood sheets, doors, and other large, flat objects. To better visualize the problem, consider the task of single-handedly moving several five-foot diameter, round, folding tables from a storage area to a hall where they will be set up for an event. The only practical way to position one of the tables on the dolly is with the round edge of the table on the lower lip of the dolly and the table top leaning against the dolly framework. In that position, the fill, five-foot diameter of the table extends crosswise on the dolly with the large flat table top surface extending perpendicular to the direction of travel (i.e., parallel to the axis of rotation of the wheels). That configuration hinders movement of the dolly and table down narrow passageways and through narrow doorways.

The same problem applies to other large, flat objects such as large plywood sheets and doors that have a relatively large surface area and small thickness. Thus, a need exists for a better way to single-handedly move such objects.

SUMMARY OF THE INVENTION

This invention alleviates the concerns outlined above by providing a small, lightweight, wheeled, carrying device that holds folded tables, plywood sheets, doors, or other such objects for single-handed movement edgewise relative to the direction of travel instead of crosswise. It holds the edge of the object on a wheeled support structure so that the large surface area of the object extends vertically and parallel to the direction of travel (perpendicular to the rotational axis of the wheel), as it would be if two men grasped the object and moved it by hand. Thus, it greatly facilitates single-handed movement of large, flat objects, especially when moving down narrow passageways and through narrow doorways.

To paraphrase some of the more precise language appearing in the claims, a device for single-handedly moving folding tables, plywood sheets, doors, and other large objects, includes a first component that is a rigid body of material having first and second oppositely facing sides. It may take any of various forms, including a circular piece of ¾-inch thick plywood with a 16-inch diameter. It has a size and shape enabling a person to carry it with one hand to a position adjacent an object to be moved. A knob, kitchen cabinet handle, or other suitable handle means may be mounted on the first component to facilitate carrying.

Channels, bolts, brackets, or other suitable holding means extend outwardly from the first side of the first component for holding the marginal edge portion of the object to be moved. The marginal edge portion is held so that is spaced upwardly a few inches from the floor and so that the flat surface extends vertically, facing the first side of the first component. A wheel is mounted on the second side of the first component to function as means for wheeling the first component and the object to be moved along a desired direction of travel. According to a major aspect of the invention, the wheel rotates about an axis of rotation that is perpendicular to the flat surface of the object to be moved so that the flat surface is parallel to the direction of travel.

To use the device, a user positions the object to be moved so that the flat surface extends vertically. Next, the user sets the marginal edge portion of the object to be moved upon the holding means that extends outwardly from the first side of the first component, with the flat surface of the object against the first side of the first component. Then the user grasps the object to be moved and wheels the combination of the device and the object to be moved along the desired direction of travel.

Thus, the invention significantly facilitates single-handed movement of folded tables, plywood sheets, doors, and other such object with a small, lightweight, wheeled, carrying device that holds the object for movement edgewise relative to the direction of travel instead of crosswise. The following illustrative drawings and detailed description make the foregoing and other objects, features, and advantages of the invention more apparent.

BRIEF DESCRIPTION OF THE DRAWINGS

FIG. 5 is a side view of a second embodiment of a device constructed according to the invention that has channels adapted to hold the straight edge of a sheet of plywood or other such object;

FIG. 6 is a side view of a third embodiment of a device constructed according to the invention that has an outwardly protruding flange for holding the edge of a box;

FIG. 7 shows the device illustrated in FIG. 6 paired with a second similar device to hold opposite edges of a large box;

DESCRIPTION OF THE PREFERRED EMBODIMENTS

Figure 1:
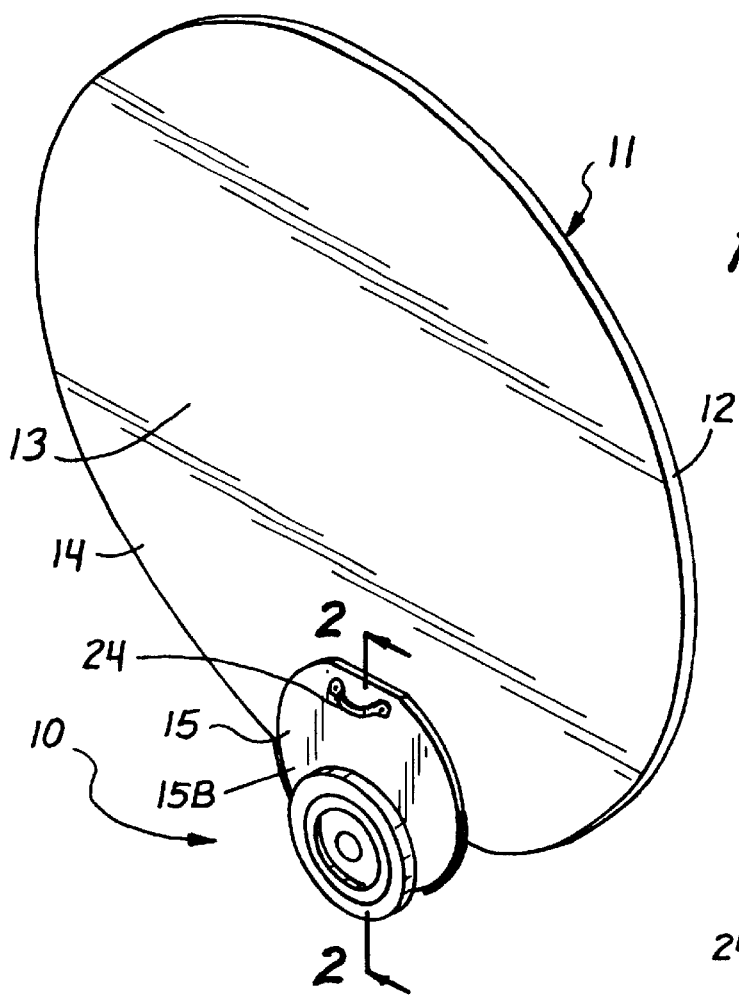
FIG. 1 of the drawings is an isometric view of a device constructed according to the invention shown carrying a five-foot diameter folding table.
Figure 2:
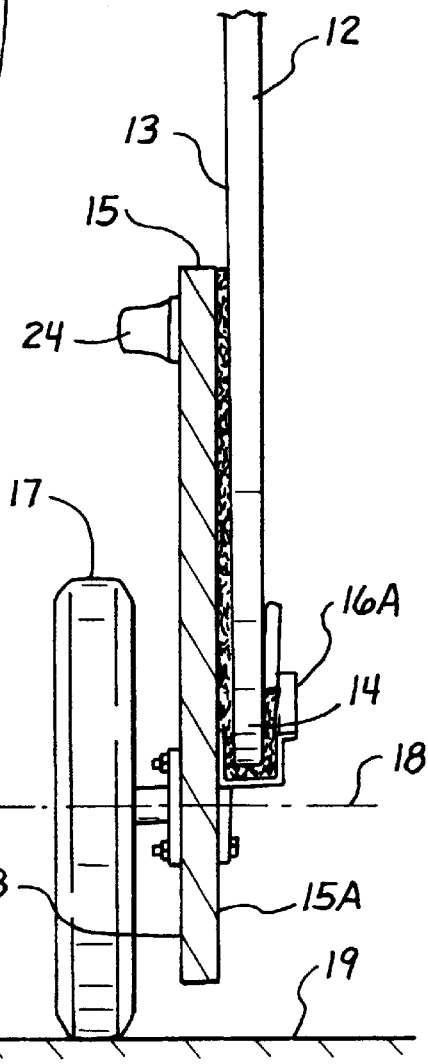
FIG. 2 is an enlarged cross sectional view of the device taken on line 2—2 of FIG. 1.

FIGS. 1–4 of the drawings show various aspects of a device 10 constructed according to the invention. It is shown carrying a folding table 11 of the type having a five-foot diameter circular top 12 with a large, flat surface 13 and a marginal edge portion 14 to which the surface 13 extends (FIGS. 1–4). Generally, the device 10 includes a first component 15 that is a rigid body of material (e.g., a 16-inch diameter circular piece of ¾-inch thick plywood) to which the other components are attached. Holding means, including first and second outwardly extending members in the form of two upwardly opening U-shaped channel members 16A and 16B (FIGS. 3 and 4), extend outwardly from a first side 15A of the first component 15 in spaced apart locations. A wheel 17 is mounted on a second side 15B of the first component 15 by suitable means for rotation about an axis of rotation 18 (FIG. 2) that is perpendicular to the first side 15A of the first component 15. These elements combine to enable a user to single-handedly move the table 11 across a floor 19 or other surface along a direction of travel depicted by an arrow 20 in FIG. 3.

Figure 3:
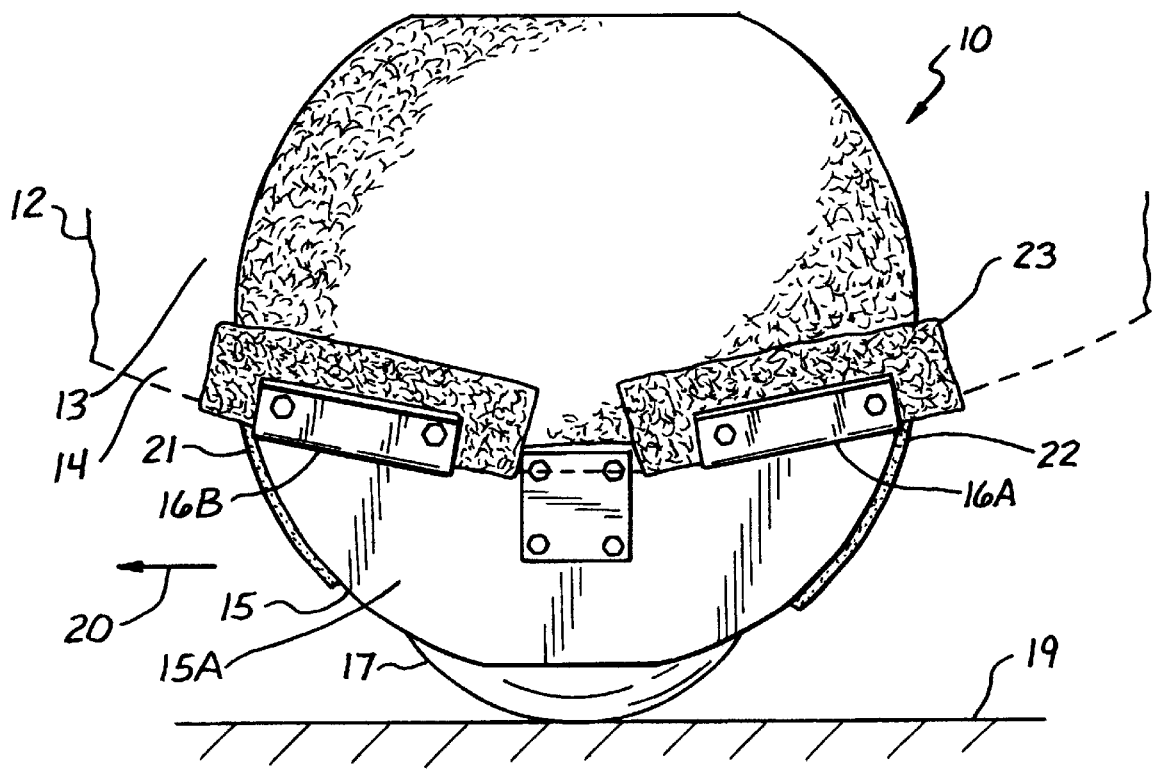
FIG. 3 is an enlarged side view showing further details of the channels holding the edge of the table.
Figure 4:
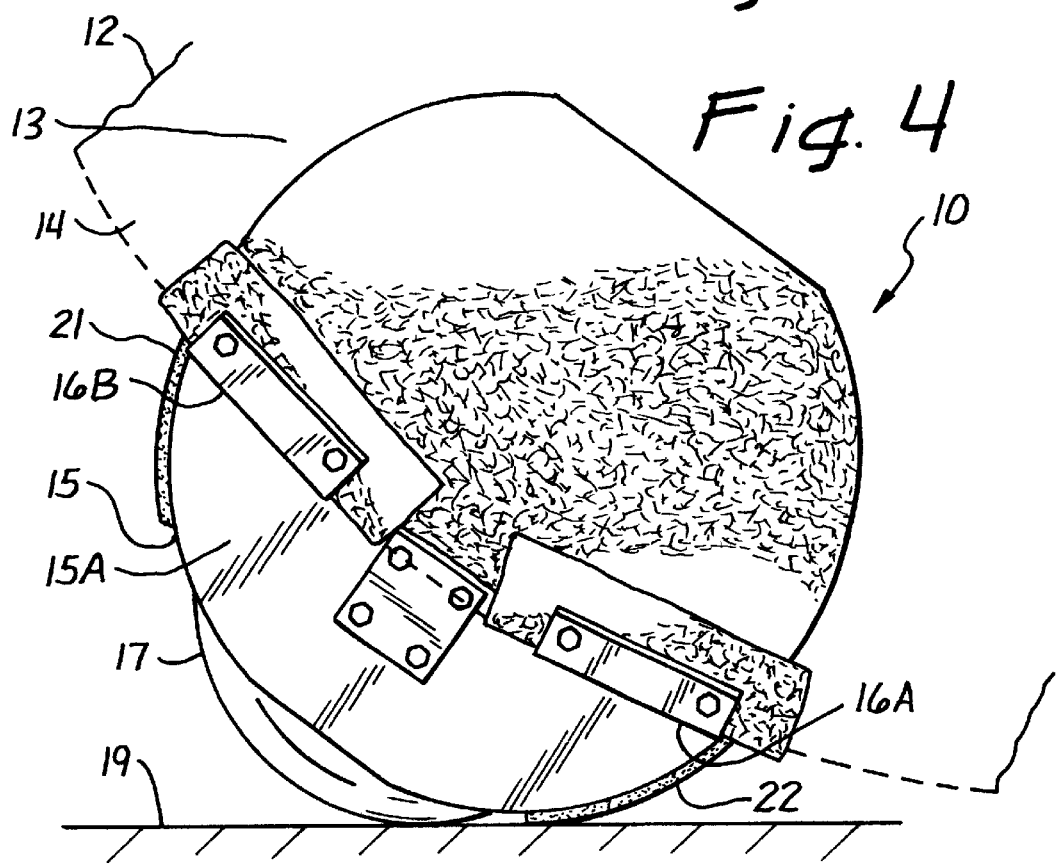
FIG. 4 is a side view similar to FIG. 3 showing how the edge of the table is placed into the channels of the device.

The channel members 16A and 16B extend outwardly from the first side 15A of the first component 15 where they hold the marginal edge portion 14 of the table top 12, with the surface 13 of the table top 12 extending vertically and facing the first side 15A of the first component 15. The channel members 16A and 16B (e.g., ¹⁄₁₆-inch thick steel channels about 4.5 inches long that form 1-inch wide by 1.25 inches deep channels) are mounted on the first side 15A of the first component 15 by suitable means (e.g., screws) in the inclined positions illustrated in FIGS. 3 and 4. In FIG. 3, they are inclined roughly ten degrees or so to the floor 19. Being inclined adapts them to receive a circularly shaped marginal edge portion of an object to be moved, such as the marginal edge portion 14 of the table top 12.

The wheel 17 (e.g., 10-inch diameter wagon wheel) is mounted on the first component 15 to function as means for wheeling the first component 15 and the table top 12 along the desired direction of travel (arrow 20 in FIG. 3). Having the axis of rotation 18 of the wheel 17 perpendicular to the first side 15A of the first component 15 results in the direction of travel (depicted by the arrow 20 in FIG. 3) being parallel to the first side 15A of the first component 15 and therefore parallel to the surface 13 of the table top 12. In other words, the device 10 holds the marginal edge portion 14 of the table top 11 so that the large surface 13 of the table top 12 extends vertically and parallel to the direction of travel, as it would be if two men grasped the object and moved it by hand. Thus, it greatly facilitates single-handed movement of large, flat objects, especially when moving down narrow passageways and through narrow doorways.

Preferably, the device 10 includes soft bumper members 21 and 22 (FIGS. 3 and 4) on the first component 15 that help prevent marring of the floor 19. Similarly, a cloth covering 23 helps prevent marring of the table top 12. A handle 24 (FIGS. 1 and 2) facilitates carrying.

To use the device 10, the user positions the table top 12 so that the surface 13 extends vertically (the position illustrated in FIGS. 1–4). Next, the user places the device 10 adjacent the table top 12 in the position illustrated in FIG. 4, so that the marginal edge portion 14 of the table top 12 rests in the channel members 16A and 16B. After that, the user rotates the device 10 and the table top 12 to the position illustrated in FIG. 3. Then, while continuing to grasp the table top 12, the user wheels the device 10 and table 11 edgewise (arrow 20 in FIG. 3) to a desired location.

Now consider FIG. 5. It shows a second embodiment of a device constructed according to the invention that is designated device 100. The device 100 is similar in many respects to the device 10 and so only differences are described in further detail. For convenience, reference numerals designating parts of the device 100 are increased by one hundred over reference numerals designating related parts of the device 10.

The device 100 includes a first component 115 with a first side 115A, a wheel 117, and holding means in the form of two upwardly opening U-shaped channel members 116A and 116B. The major difference is that the channel members 116A and 116B are not inclined. They are attached to the first component in aligned positions as illustrated in FIG. 5. That adapts them to receive a straight marginal edge portion 114 of an object to be moved such as a sheet 130 of plywood. The user places the marginal edge portion of the sheet 130 in the channel members so that the device 100 is located closed to one vertical edge of the sheet 130 than the opposite edge. The user then lifts the opposite edge of the sheet 130 to wheel the device 100 and sheet 130 edgewise across a floor 119.

Next consider FIGS. 6 and 7. They show a third embodiment of a device constructed according to the invention that is designated device 200. The device 200 is similar in many respects to the device 10 and so only differences are described in further detail. For convenience, reference numerals designating parts of the device 200 are increased by two hundred over reference numerals designating related parts of the device 10.

The device 200 includes a first component 215 with a first side 215A, a wheel 217, and holding means (FIG. 6). The major difference is that the holding means takes the form of an outwardly protruding member 240 attached to and extending outwardly from the first side 215A of the first component 215. The member 240 has an upwardly facing surface 241 and a plurality of protrusions 242, 243, and 244 extending upwardly from the surface 241 about ¹⁄₁₆-inch or so. That adapts the device 200 for holding a box 245 (FIG. 7). The protrusions 242, 243, and 244 function as means for engaging the marginal edge portion of an object to be moved (i.e., the underside of the marginal edge portion). A second similar device 200A is also used for that purpose as illustrated in FIG. 7.

The user lifts the box 245 slightly to place it on the device 200. A first side 246 of the box 245 faces the device 200 and the underside 247 of the box 245 rests upon the surface 241 of the member 240 while the protrusions 242, 243, and 244 grip (engage) the underside 247. A second side 248 of the box 245 rest upon the second device 200A in a similar manner. The user grasps and balances the box 245 on the devices 200 and 200A to wheel the whole combination across a floor 219.

Figure 8:
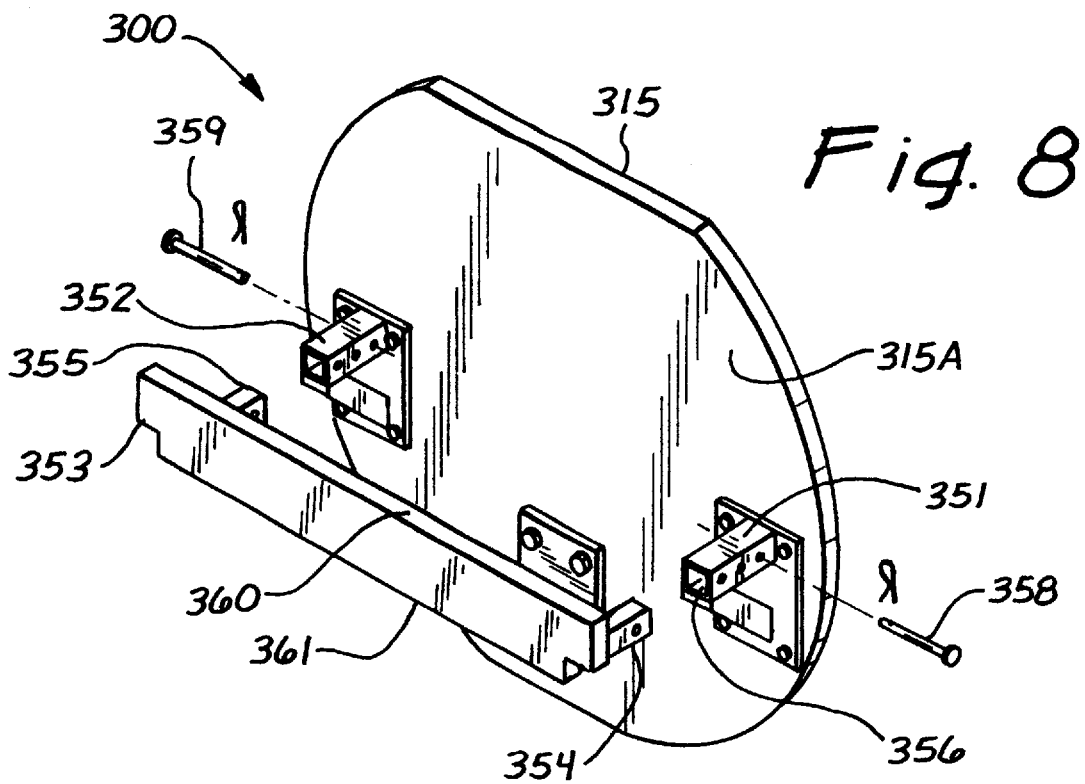
FIG. 8 is perspective view of a fourth embodiment of a device constructed according to the invention that has two flanges that provide two outwardly extending protrusions that cooperate with an adjustable rail for holding either a straight or rounded edge.
Figure 9:
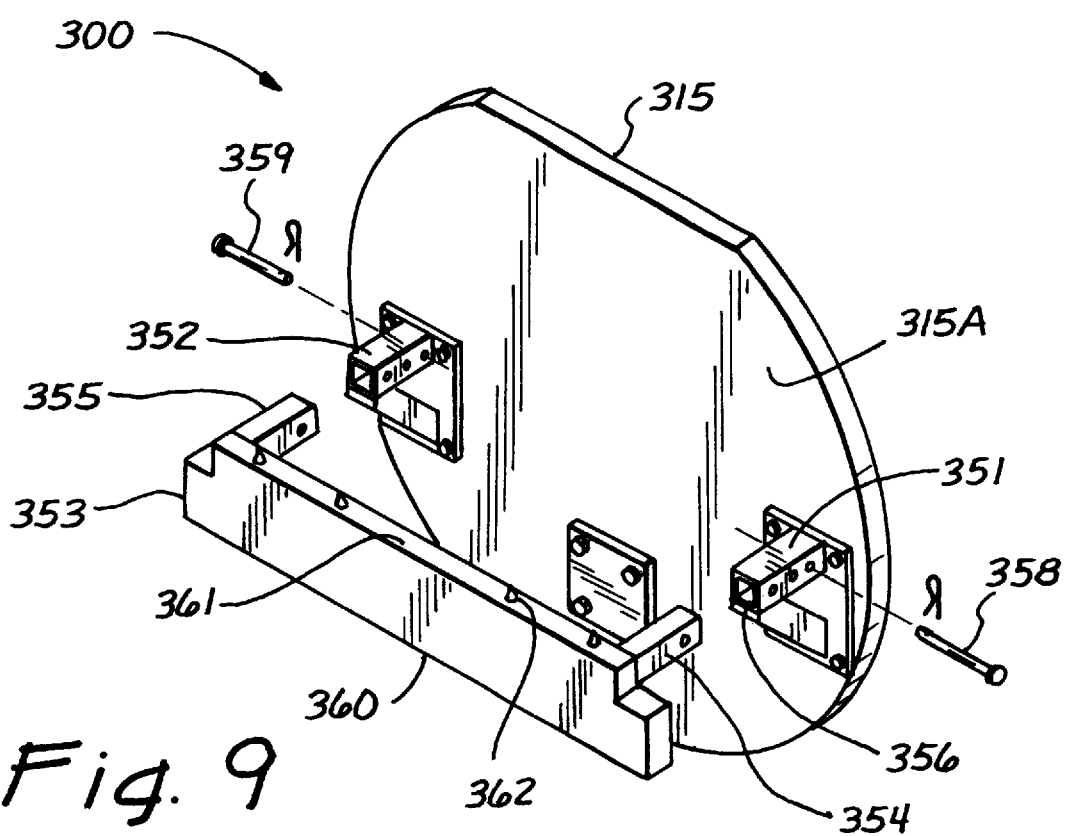
FIG. 9 is a perspective view of the device in FIG. 8 with the rail inverted for use in holding a large box in the manner of the device illustrated in FIGS. 6 and 7.

FIGS. 8 and 9 show a fourth embodiment of a device constructed according to the invention that is designated device 300. The device 300 is similar in many respects to the device 10 and so only differences are described in further detail. For convenience, reference numerals designating parts of the device 300 are increased by three hundred over reference numerals designating related parts of the device 10.

The device 300 includes a first component 315 with a first side 315A, a wheel mounted on the first component 315 (not visible), and holding means (FIGS. 8 and 9). The major difference is that the holding means takes the form of first and second outwardly extending members in the form of two spaced apart bracket members 351 and 352. In the broader sense, the two outwardly extending members may take the form of two bolts or other such protrusions. The marginal edge portion of an object to be moved, whether circular or straight, rests upon them. They adapt the holding means to holding a user selected one of a circularly shaped marginal edge portion and a straight marginal edge portion In other words, they work both with circular edges (e.g., circular table tops) and straight edges (e.g., doors and plywood sheets).

The illustrated bracket members 351 and 352 are attached to the first side 315A of the first component 315 by suitable means (e.g., screws or bolts) so that they extend perpendicularly from the first side 315A as illustrated in FIGS. 8 and 9. Size and spacing may vary within the scope of the claims. The illustrated bracket members 351 and 352 extend outwardly from the first side 315A about 1.75 inches and they are spaced apart about 8.75 inches.

The device 300 also includes a rail member 353 that extends between the bracket members 351 and 352. It mounts removably and adjustably on the two bracket members 351 and 352 by securing male members 354 and 355 of the rail member in female members 356 and 357 of the bracket members using two cotter pins 358 and 359. A normally upwardly disposed edge 360 on the rail member 353 extends above the brackets about 1.25 inches when the rail member 353 is in the position illustrated in FIG. 8 so that the rail member 353 functions as means for holding the object to be moved toward the first side 315A of the first component 315.

The rail member 353 is adjustable in order to enable a user to set the rail member 353 at a selected distance from the first side 315A. The user can set the rail member 353 to accommodate the thickness of the marginal edge portion of a selected object to be moved. For that purpose, the illustrated rail member 353 can be adjusted in increments for distances from the first side 315A of about ¾ inch to about 2 inches.

The rail member 353 is removable so that it can be inverted to the position illustrated in FIG. 9. In the inverted position, a normally downwardly facing surface 361 is in a position facing upwardly for holding the marginal edge portion of a box (not shown) in the manner described previously for the device 200 illustrated in FIGS. 6 and 7. Stated another way, the rail member 353 includes a normally downwardly facing surface 361 and the rail member is mounted on the first and second outwardly extending members (i.e., the bracket members 351 and 352) removably in order to enable a user to invert the rail member 353 relative to the first component 315 so that the normally downwardly facing surface 361 is facing upwardly for holding the marginal edge portion of a box. Preferably, the rail member 353 includes a plurality of protrusions extending from the normally downwardly facing surface 361 that function as means for engaging the marginal edge portion of the box in the manner described for the device 200. Only one protrusion 362 is designated in FIG. 9 in order to keep the view less cluttered.

Thus, the invention provides a small, lightweight, wheeled, carrying device that holds folded tables, plywood sheets, doors, or other such objects for single-handed movement edgewise relative to the direction of travel instead of crosswise, as if two men grasped the object and moved it by hand. Some of the embodiments even work with a box. Thus, it greatly facilitates single-handed movement of large, flat objects, especially when moving down narrow passageways and through narrow doorways. Although exemplary embodiments have been shown and described, one of ordinary skill in the art may make many changes, modifications, and substitutions without necessarily departing from the spirit and scope of the invention.

What is claimed is:

1. A device for single-handedly moving folding tables, plywood sheets, doors, and other large objects, the device comprising:

a first component that is a rigid body of material having first and second oppositely facing sides and a size and shape enabling a person to carry the first component with one hand to a position adjacent an object to be moved of the type having a flat surface and a marginal edge portion to which the flat surface extends;

holding means extending outwardly from the first side of the first component for holding the marginal edge portion of the object to be moved with the flat surface of the object to be moved extending vertically and facing the first side of the first component; and a wheel mounted on the first component to function as means for wheeling the first component and the object to be moved along a desired direction of travel so that the first side of the first component and the flat surface of the object to be moved are parallel to the direction of travel;

wherein the holding means includes first and second upwardly opening U-shaped channel members attached to the first side in inclined positions adapted to receive a circularly shaped marginal edge portion of an object to be moved.

2. A device for single-handedly moving tables, plywood sheets, doors, and other large objects, the device comprising:

a first component that is a rigid body of material having first and second oppositely facing sides and a size and shape enabling a person to carry the first component with one hand to a position adjacent an object to be moved of the type having a flat surface and a marginal edge portion to which the flat surface extends;

holding means extending outwardly from the first side of the first component for holding the marginal edge portion of the object to be moved with the flat surface of the object to be moved extending vertically and facing the first side of the first component; and a wheel mounted on the first component to function as means for wheeling the first component and the object to be moved along a desired direction of travel so that the first side of the first component and the flat surface of the object to be moved are parallel to the direction of travel;

wherein the holding means includes first and second outwardly extending members that extend outwardly from the first side of the first component in spaced apart locations to thereby adapt the holding means to hold a user selected one of a circularly shaped marginal edge portion and a straight marginal edge portion; and wherein the holding means includes a rail member extending between the first and second outwardly extending members that functions as means for holding the object to be moved toward the first side of the first component.

3. A device as recited in claim 2, wherein the rail member includes a normally downwardly facing surface and the rail member is mounted on the first and second outwardly extending members removably in order to enable a user to invert the rail member relative to the first component so that the normally downwardly facing surface is facing upwardly for holding the marginal edge portion of a box.

4. A device as recited in claim 3, wherein the rail member includes a plurality of protrusions extending from the normally downwardly facing surface that function as means for engaging the marginal edge portion of the box.

5. A device for single-handedly moving folding tables, plywood sheets, doors, and other large objects, the device comprising:

a first component that is a rigid body of material having first and second oppositely facing sides and a size and shape enabling a person to carry the first component with one hand to a position adjacent an object to be moved of the type having a flat surface and a marginal edge portion to which the flat surface extends;

holding means extending outwardly from the first side of the first component for holding the marginal edge portion of the object to be moved with the flat surface of the object to be moved extending vertically and facing the first side of the first component; and a wheel mounted on the first component to function as means for wheeling the first component and the object to be moved along a desired direction of travel so that the first side of the first component and the flat surface of the object to be moved is parallel to the direction of travel;

the holding means including first and second outwardly extending members that extend outwardly from the first side of the first component in spaced apart locations to thereby adapt the holding means to hold a user selected one of a circularly shaped marginal edge portion and a straight marginal edge portion; and the holding means including a rail member extending between the first and second outwardly extending members that functions as means for holding the object to be moved toward the first side of the first component, said rail member being mounted on the first and second outwardly extending members adjustably in order to enable a user to set the rail member at a selected distance from the first side of the first component.

* * * * *